(12) United States Patent
Orender et al.

(10) Patent No.: US 11,642,972 B2
(45) Date of Patent: May 9, 2023

(54) FLEXIBLE BATTERY SYSTEM FOR A VEHICLE

(71) Applicant: Kitty Hawk Corporation, Palo Alto, CA (US)

(72) Inventors: Joseph Orender, Cupertino, CA (US); Christopher Scott Saunders, San Jose, CA (US); Derek Wong, Fremont, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 75 days.

(21) Appl. No.: 16/904,335

(22) Filed: Jun. 17, 2020

(65) Prior Publication Data

US 2021/0061110 A1    Mar. 4, 2021

Related U.S. Application Data

(63) Continuation of application No. 16/556,718, filed on Aug. 30, 2019, now Pat. No. 10,723,235.

(51) Int. Cl.
*B60L 50/60* (2019.01)
*H02J 7/00* (2006.01)
*B64D 27/24* (2006.01)
*B64C 27/00* (2006.01)
*H02P 5/00* (2016.01)

(52) U.S. Cl.
CPC ............. *B60L 50/66* (2019.02); *B64D 27/24* (2013.01); *H02J 7/0024* (2013.01); *B60L 2200/10* (2013.01); *B64C 27/00* (2013.01); *H02P 5/00* (2013.01)

(58) Field of Classification Search
CPC ...... B60L 50/66; B60L 2200/10; H02J 7/0024
See application file for complete search history.

(56) References Cited

U.S. PATENT DOCUMENTS

| | | | | |
|---|---|---|---|---|
| 5,764,032 A | * | 6/1998 | Moore | H02J 7/0024 320/126 |
| 5,784,626 A | * | 7/1998 | Odaohara | H02J 9/061 713/300 |
| 6,342,775 B1 | * | 1/2002 | Sleder, Sr. | H02J 5/00 320/116 |
| 11,165,264 B2 | * | 11/2021 | Miller | H02J 7/0021 |
| 2005/0052154 A1 | * | 3/2005 | Kavounas | H02J 7/345 320/116 |
| 2006/0076171 A1 | * | 4/2006 | Donnelly | B60L 7/12 180/65.225 |

(Continued)

FOREIGN PATENT DOCUMENTS

| | | |
|---|---|---|
| JP | 2018085790 | 5/2018 |
| JP | 2019518662 | 7/2019 |

*Primary Examiner* — Daniel Kessie
*Assistant Examiner* — Brian K Baxter
(74) *Attorney, Agent, or Firm* — Van Pelt, Yi & James LLP

(57) ABSTRACT

A configuration instruction associated with configuring a plurality of batteries which supply power to a plurality of motors in a vehicle is received. The batteries are configuring as specified by the configuration instruction, where the batteries are able to be configured in a plurality of configurations, including: a first configuration where at least some of the batteries are electrically connected together in parallel and a second configuration where at least some of the batteries are electrically connected together in series.

21 Claims, 11 Drawing Sheets

(56) References Cited

U.S. PATENT DOCUMENTS

| | | | |
|---|---|---|---|
| 2009/0085515 A1* | 4/2009 | Bourilkov | H02J 7/0024 320/117 |
| 2010/0026244 A1* | 2/2010 | Iida | B66B 5/027 320/134 |
| 2010/0261043 A1* | 10/2010 | Kim | H01M 10/4257 429/61 |
| 2011/0001442 A1 | 1/2011 | Lee | |
| 2011/0024555 A1* | 2/2011 | Kuhn, Jr. | B64C 29/0033 244/17.25 |
| 2012/0056040 A1* | 3/2012 | Brotherton-Ratcliffe | B64D 27/10 244/23 A |
| 2012/0133310 A1* | 5/2012 | Lee | B60L 58/21 318/139 |
| 2013/0200848 A1* | 8/2013 | Ozawa | H01M 10/441 320/112 |
| 2013/0300370 A1* | 11/2013 | Hotta | H01M 10/482 320/117 |
| 2014/0184162 A1* | 7/2014 | Takahashi | H01M 10/0525 320/128 |
| 2017/0163035 A1* | 6/2017 | Zhyhinas | H02J 7/0014 |
| 2017/0207640 A1 | 7/2017 | Wang | |
| 2017/0217318 A1* | 8/2017 | Kowalewski | B60L 58/20 |
| 2017/0331323 A1* | 11/2017 | Ehrmantraut | H02K 7/14 |
| 2019/0081364 A1* | 3/2019 | Capati | B60L 50/66 |
| 2019/0089169 A1* | 3/2019 | Okamura | H02J 7/0024 |
| 2019/0103750 A1* | 4/2019 | Kristensen | H02J 7/0024 |
| 2019/0126761 A1* | 5/2019 | Verbridge | H01M 10/441 |
| 2019/0135128 A1* | 5/2019 | Kim | H02J 7/0024 |
| 2019/0199108 A1* | 6/2019 | Hiroe | H02J 7/0021 |
| 2019/0241274 A1* | 8/2019 | Hunkel | B60L 50/40 |
| 2019/0291862 A1* | 9/2019 | Lyasoff | G05D 1/102 |
| 2019/0291863 A1* | 9/2019 | Lyasoff | B64U 50/13 |
| 2020/0079520 A1* | 3/2020 | Demizu | H02J 7/34 |
| 2020/0339010 A1* | 10/2020 | Villanueva | B60L 58/26 |

* cited by examiner

FLEXIBLE BATTERY SYSTEM FOR A VEHICLE

CROSS REFERENCE TO OTHER APPLICATIONS

This application is a continuation of U.S. patent application Ser. No. 16/556,718 now U.S. Pat. No. 10,723,235 entitled FLEXIBLE BATTERY SYSTEM FOR A VEHICLE filed Aug. 30, 2019 which is incorporated herein by reference for all purposes.

BACKGROUND OF THE INVENTION

New types of battery-powered vehicles are being developed with new designs and/or configurations. For example, Kitty Hawk Corporation has developed a battery-powered multicopter that is capable of taking off from and/or landing on water if desired. New types of battery systems and/or architectures that work within the framework or constraints of such new vehicle designs and/or configurations and that also improve some aspect of the vehicle's use and/or management would be desirable.

BRIEF DESCRIPTION OF THE DRAWINGS

Various embodiments of the invention are disclosed in the following detailed description and the accompanying drawings.

DETAILED DESCRIPTION

Figure 1A:
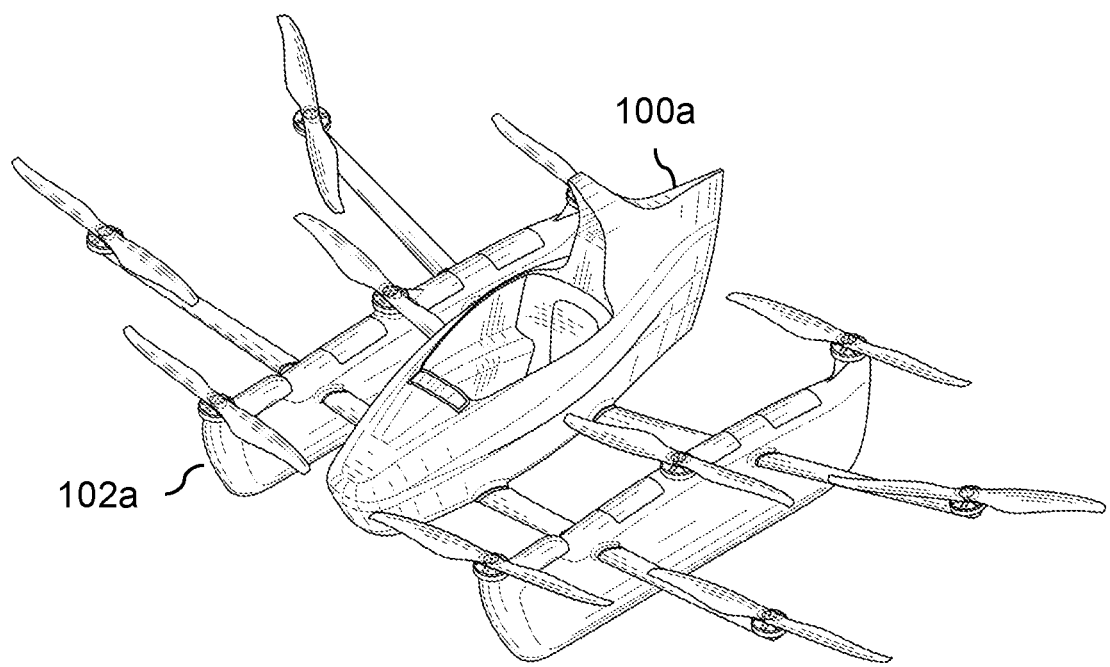
FIG. 1A is a perspective view of an embodiment of a battery-powered vehicle.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a flexible battery system for use in or by a vehicle are described herein. In some embodiments, a configuration instruction associated with configuring a plurality of batteries which supply power to a plurality of motors in a vehicle is received (e.g., by a battery configuration controller). The plurality of batteries is configured as specified by the configuration instruction, wherein the plurality of batteries is able to be configured in a plurality of configurations, including: (1) a first configuration where at least some of the plurality of batteries are electrically connected together in parallel and (2) a second configuration where at least some of the plurality of batteries are electrically connected together in series. In some cases, all of the motors in the vehicle are powered by the entire set of batteries. Alternatively, one set of motors may be powered by one set of batteries, and another set of motors may be powered by another set of batteries. As will be described in more detail below, the various configurations may be useful and/or beneficial in a variety of situations.

FIG. 1A is a perspective view of an embodiment of a battery-powered vehicle. In the example shown, the multicopter (100a) is a battery-powered vehicle that is capable of performing takeoffs and landings on water, if desired. The multicopter has two floats or pontoons (102a) which are hollow and provide sufficient water displacement for the multicopter to have positive buoyancy and float on water. Alternately, the multicopter can take off from or land on solid ground if desired.

Figure 1B:
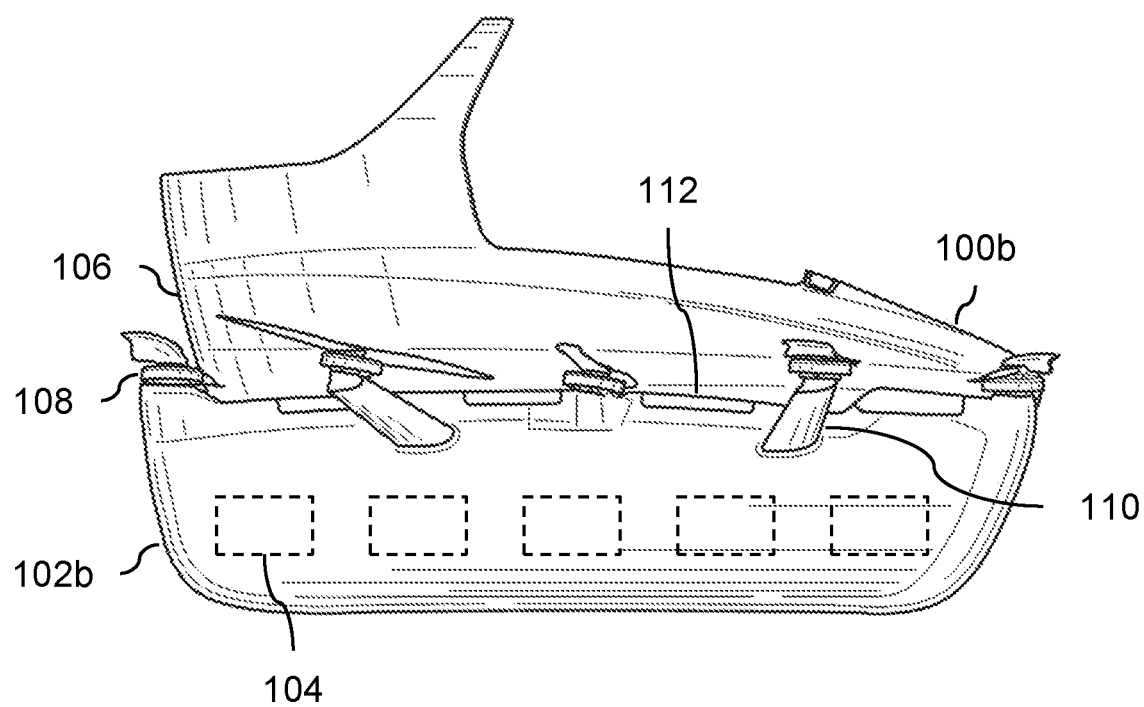
FIG. 1B is a side view of an embodiment of a battery-powered vehicle.

FIG. 1B is a side view of an embodiment of a battery-powered vehicle. FIG. 1B continues the example of FIG. 1A. In this example, each float (102b) in the vehicle (100b) is used to hold five batteries (104). This design choice (of storing the batteries in the floats (102b) as opposed to the fuselage (106)) was made in part because it permits shorter electrical connections to the motors (108) which are dispersed on the tops of the floats (102b) and the distal ends of the booms (110). This also permits a recovery system (e.g., one or more parachutes) to be stored in the fuselage (106) behind the cockpit.

The design choice of using multiple, smaller batteries as opposed to a single, larger battery also works with the vehicle's limited access to the interior of the floats. To prevent water intrusion into the floats (which also contain other water-sensitive electrical components, such as the printed circuit boards which control the motors), access to the interior of the floats is limited to three access ports (112) on the top of the floats. With these relatively small access ports, it is easier to insert multiple, smaller batteries as opposed to a single, larger battery.

In an earlier version of this vehicle, each battery (104) was paired with a corresponding motor (108) so that each battery only supplied power to one motor and each motor was only powered by one battery. However, as will be described in more detail below, a flexible or configurable battery system (e.g., where the batteries and/or the motors are able to be electrically connected together in a variety of ways) may be desirable for charging purposes, safety, better flight performance, etc. The following figures describe various examples of such a flexible battery system.

Figure 2:
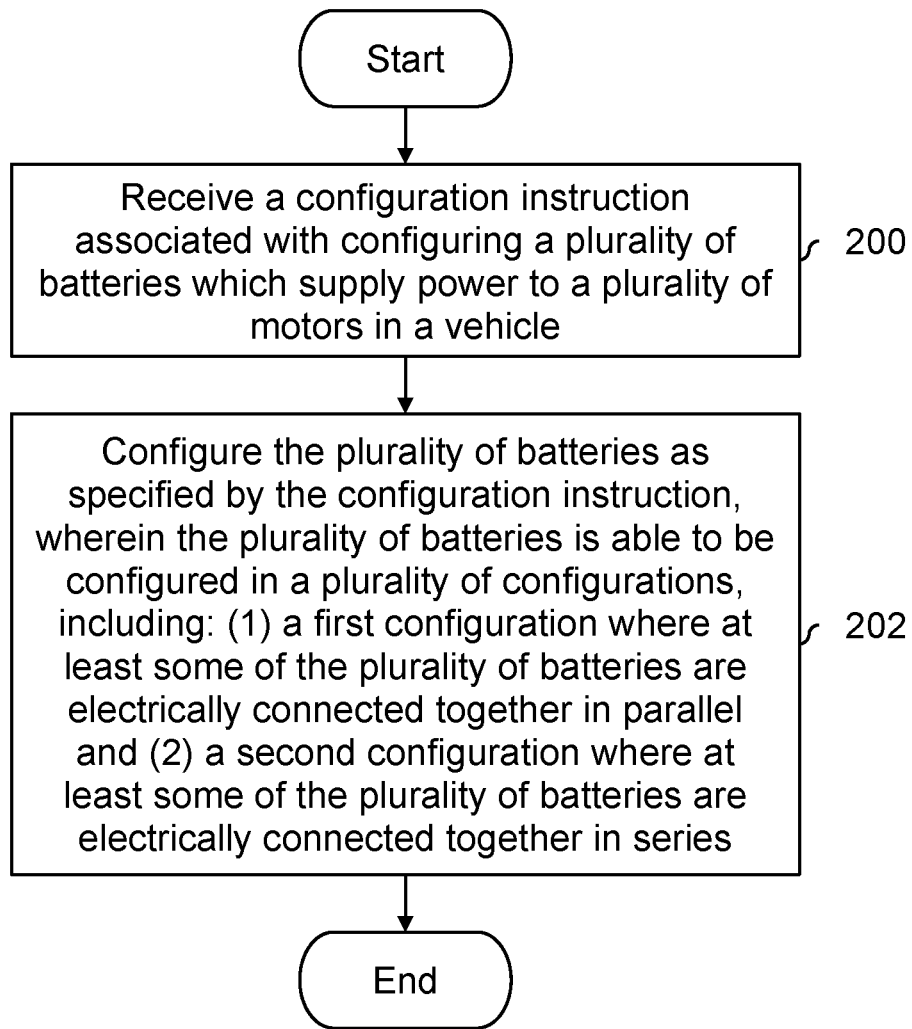
FIG. 2 is a flowchart illustrating an embodiment of a process to configure a plurality of batteries which supply power to a plurality of motors in a vehicle.

FIG. 2 is a flowchart illustrating an embodiment of a process to configure a plurality of batteries which supply power to a plurality of motors in a vehicle. For example, the 10 batteries in multicopter 100a and 100b in FIGS. 1A and 1B may be configured in a variety of ways to supply power to the 10 motors (e.g., 108 in FIG. 1B).

At 200, a configuration instruction associated with configuring a plurality of batteries which supply power to a plurality of motors in a vehicle is received. In some embodiments, the configuration instruction is generated based on a state of the vehicle. For example, if the vehicle is being charged, then a corresponding configuration instruction (e.g., so that the batteries are configured in a way that is desirable for charging) is sent to a controller which controls the configurable electrical connectors. Or, if the vehicle is starting up (e.g., in anticipation of a takeoff), then a configuration instruction that corresponds to flight and/or that helps with flight performance may be sent to the controller which controls the configurable electrical connectors.

At 202, the plurality of batteries are configured as specified by the configuration instruction, wherein the plurality of batteries is able to be configured in a plurality of configurations, including: (1) a first configuration where at least some of the plurality of batteries are (e.g., electrically) connected together in parallel and (2) a second configuration where at least some of the plurality of batteries are (e.g., electrically) connected together in series. For example, if at least some of the batteries are connected together in parallel, that (first) configuration may improve flight performance when one motor is drawing significantly more power than the other motor. An example of this is described in more detail below.

Figure 3:
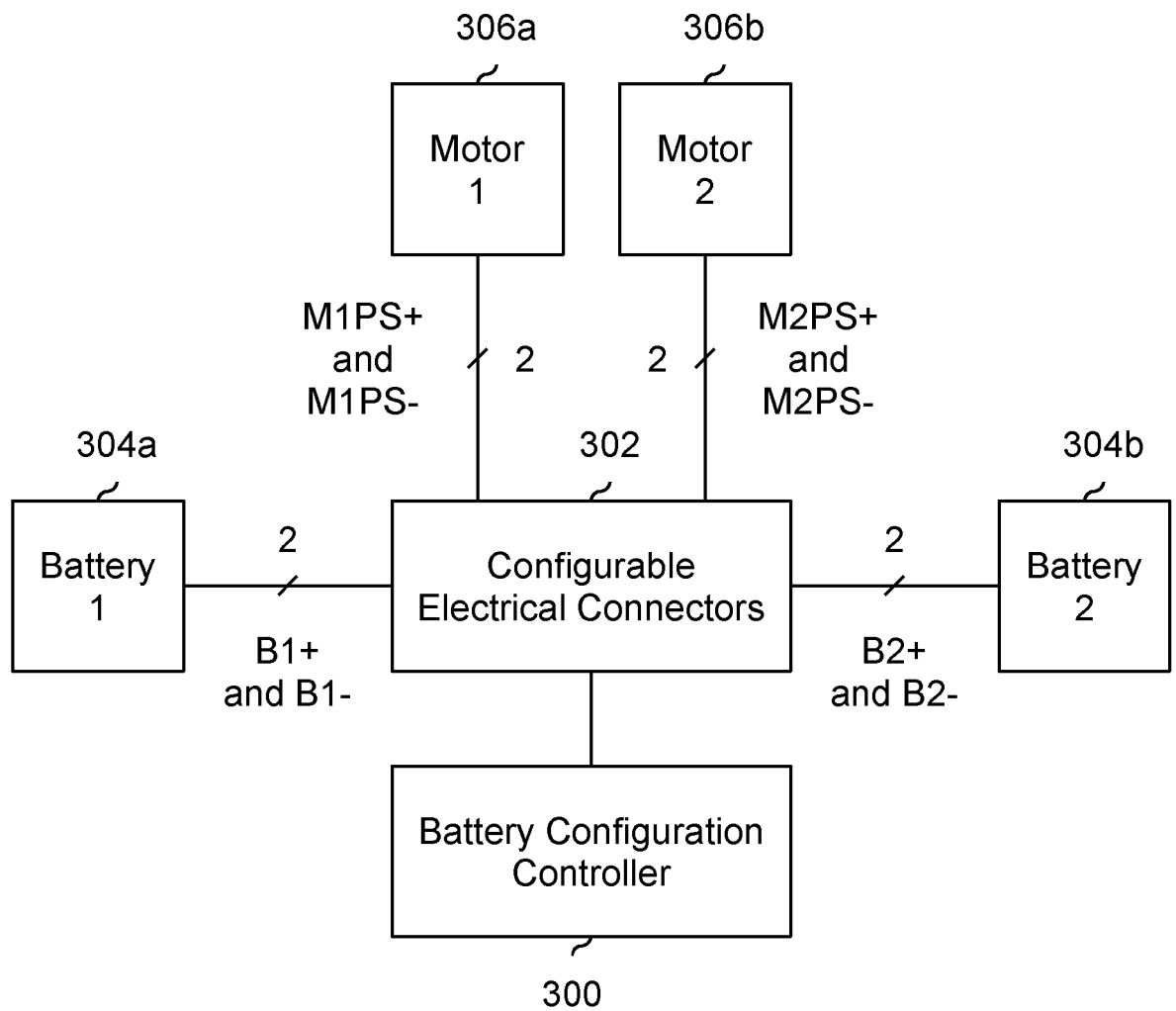
FIG. 3 is a diagram illustrating an embodiment of a flexible battery system.

FIG. 3 is a diagram illustrating an embodiment of a flexible battery system. For simplicity and ease of explanation, this example and some other examples described herein only include two batteries and two motors. Naturally, other embodiments may include different numbers of batteries and/or motors.

The battery configuration controller (300) receives configuration instructions, for example, from some other controller such as a flight controller or a central controller (e.g., which knows if the vehicle is on the ground and going to be charged, will soon take off, etc.), and configures the electrical connectors (302) accordingly.

The positive and negative connectors (e.g., B1+, B1−, B2+, and B2−) of the batteries (304a and 304b) are connected to the configurable electrical connectors (302). For example, the configurable electrical connectors may include one or more switches which permit the battery connections (e.g., B1+, B1−, B2+, and B2−) to be connected together in a variety of ways (e.g., in parallel or in series). The switches in the configurable electrical connectors (302) are controlled by the battery configuration controller (300).

Similarly, the positive and negative power supplies (e.g., M1PS+, M1PS−, M2PS+, and M2PS−) to the motors (306a and 306b) are connected to the configurable electrical connectors (302) and can be configured in a variety of ways using the configurable electrical connectors (302). For example, the power supply to the first and second motor (306a and 306b) may be a shared power supply (e.g., B1+ and B2+ are electrically connected and B1− and B2− are electrically connected) or the power supplies to the two motors may be electrically isolated (e.g., B1+ and B2+ are electrically isolated and B1− and B2− are electrically isolated).

Returning briefly to step 202 in FIG. 2, the first configuration (where at least some of the batteries are connected together in parallel) may be desirable during flight when one motor is consuming significantly more power than another motor. The following figure shows an example of such a configuration and which may be desirable during flight to improve flight performance.

Figure 4:
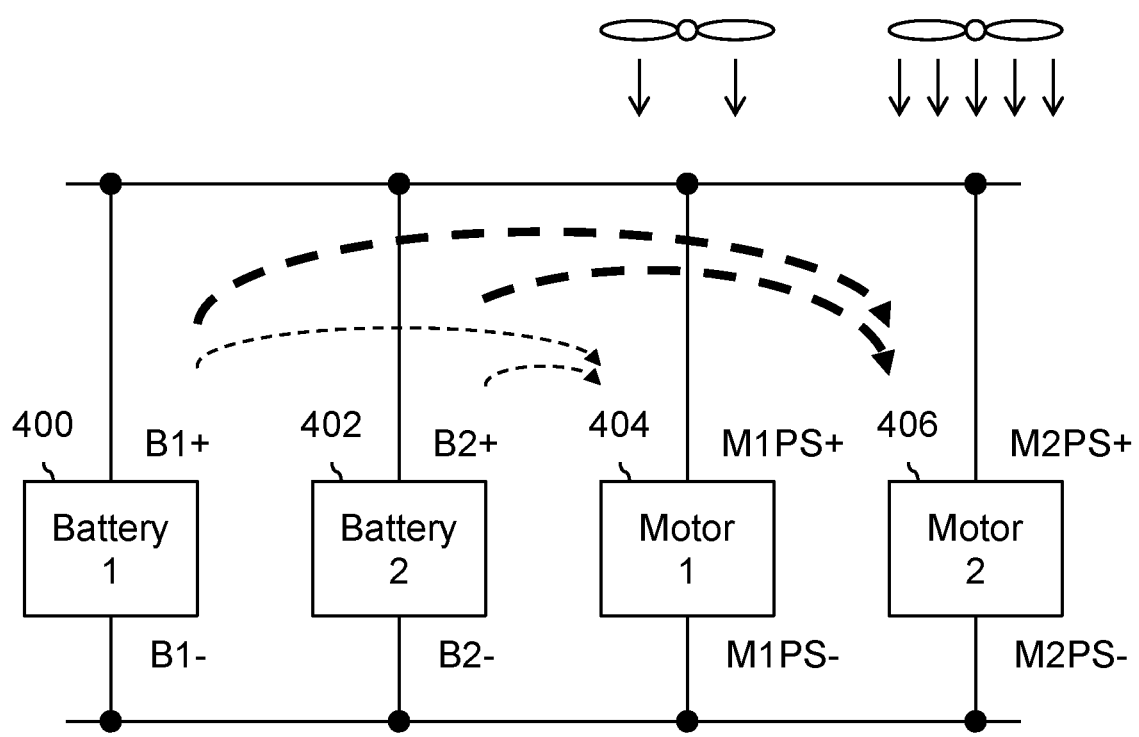
FIG. 4 is a diagram illustrating an embodiment of a flexible battery system where the batteries and motors are in a parallel configuration.

FIG. 4 is a diagram illustrating an embodiment of a flexible battery system where the batteries and motors are in a parallel configuration. For readability, the battery configuration controller (300) and configurable electrical connectors (302) shown in FIG. 3 are not shown in this figure. However, it is to be understood that a controller (e.g., 300 in FIG. 3) configured one or more configurable electrical connectors (e.g., 302 in FIG. 3), such as switches, in order to produce the configuration shown here. FIG. 4 shows one example of a (first) configuration where at least some of a plurality of batteries are electrically connected together in parallel (see step 202 in FIG. 2).

The configuration shown here may be desirable when the vehicle is flying and one of the motors (in this example, the second motor (406)) is consuming more power than the other motor (in this example, the first motor (404)). For example, the propeller attached to the second motor (406) may be producing more thrust and/or rotating faster than the propeller attached to the first motor (404).

In an older version of the vehicle (not shown), the first battery (400) would supply power to only the first motor (404) and the second battery (402) would only supply power to the second motor (406). However, if one of the motors is drawing heavily upon its battery, it would be limited or otherwise capped by the current limitations or other capacity or performance limitations of that (single) battery, even if other batteries in the system are not being fully utilized. For example, if the vehicle is turning or banking, some motors will be working harder than other motors in the vehicle and therefore some batteries will be more fully utilized than other batteries. By connecting the batteries and motors together in parallel as shown here, a more power-hungry motor (e.g., 406) can be accommodated to a degree or limit beyond that of a single battery. For example, if each battery were only connected to one motor, then the harder-driving motor (406) would be limited to a power ceiling or limitation of 1× a single battery. With the parallel arrangement shown here, that power ceiling could be increased to something strictly greater than 1× a single battery (e.g., 1.1×, 1.2×, etc.). To put it another way, by changing the arrangement of the batteries, some of the motors can be supplied with more power given the same battery capacity of the individual batteries. This is desirable because it improves flight performance (e.g., better banking or turning) without significantly increasing weight and/or requiring more expensive batteries.

In some embodiments, a flexible battery system is put into the configuration shown here (or some other similar configuration) prior to takeoff. The following figure describes this more generally and/or formally in a flowchart.

Figure 5:
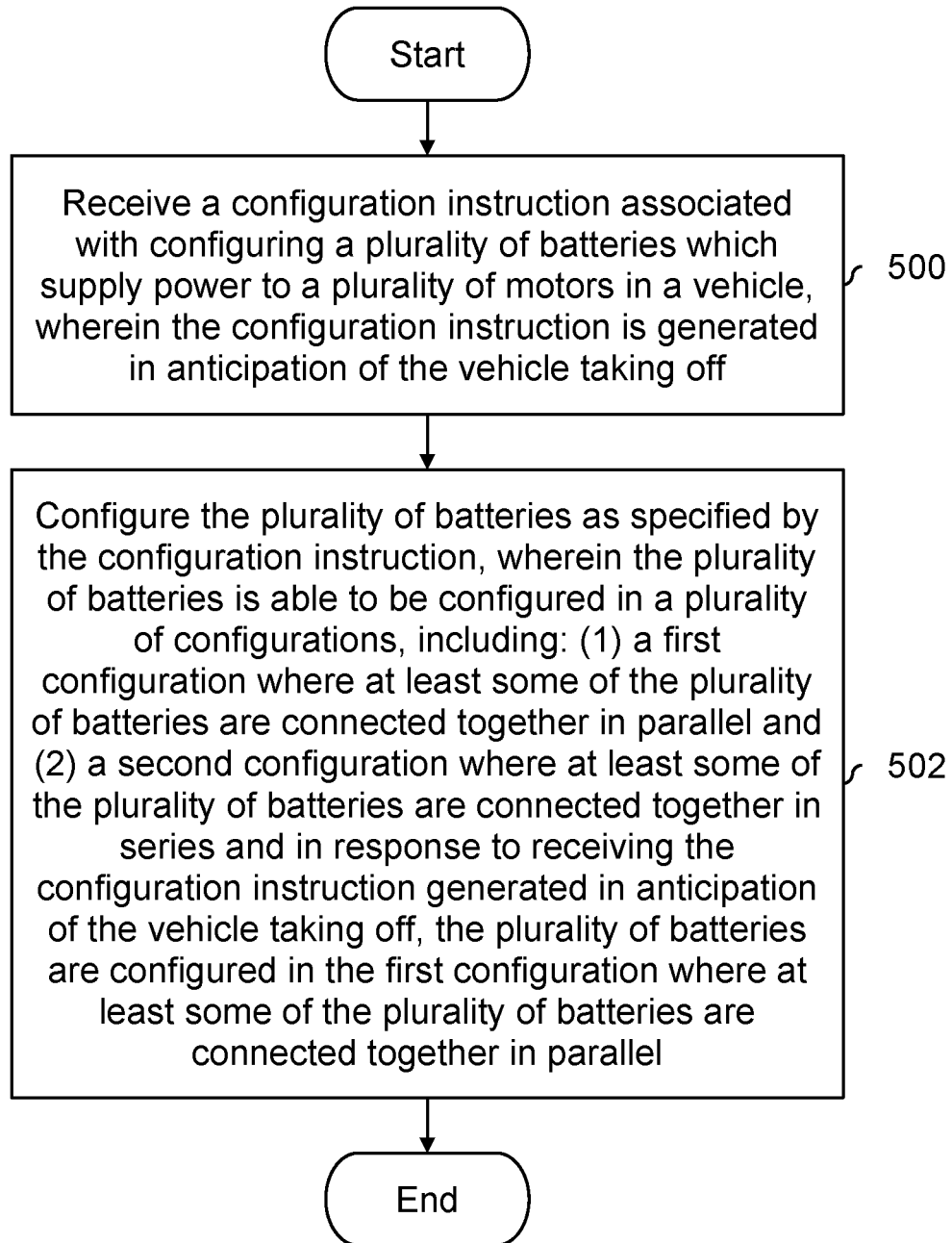
FIG. 5 is a flowchart illustrating an embodiment of a process to configure a plurality of batteries, including by connecting at least some batteries together in parallel in response to a configuration instruction generated in anticipation of the vehicle taking off.

FIG. 5 is a flowchart illustrating an embodiment of a process to configure a plurality of batteries, including by connecting at least some batteries together in parallel in response to a configuration instruction generated in anticipation of the vehicle taking off. As with the example of FIG. 2, in some embodiments the process is performed by some battery configuration controller (e.g., 300 in FIG. 3).

At 500, a configuration instruction associated with configuring a plurality of batteries which supply power to a plurality of motors in a vehicle is received, wherein the configuration instruction is generated in anticipation of the vehicle taking off.

For example, there may be some central controller or flight controller which, when the vehicle is in some pre-flight state (e.g., on the ground, getting ready to take off), generates the configuration instruction (e.g., that the vehicle is going to take off soon, that at least some of the batteries should be put into a parallel configuration, etc.) and sends it to the battery configuration controller.

At 502, the plurality of batteries are configured as specified by the configuration instruction, wherein the plurality of batteries is able to be configured in a plurality of configurations, including: (1) a first configuration where at least some of the plurality of batteries are connected together in parallel and (2) a second configuration where at least some of the plurality of batteries are connected together in series and in response to receiving the configuration instruction generated in anticipation of the vehicle taking off, the plurality of batteries are configured in the first configuration where at least some of the plurality of batteries are connected together in parallel.

For example, as described above in FIG. 4, configuring the batteries in this manner may improve flight performance by permitting some power-hungry motors (e.g., 406 in FIG. 4) to have access to power beyond that of a single battery in some cases (e.g., when the other motor(s), such as 404 in FIG. 4, are consuming smaller amounts of power and the batteries have available capacity or resources).

Returning briefly to step 202 in FIG. 2, the second configuration (where at least some of the batteries are connected together in series) may be desirable when the batteries are being charged. The following figure shows an example of such a configuration and which may be desirable during charging.

Figure 6:
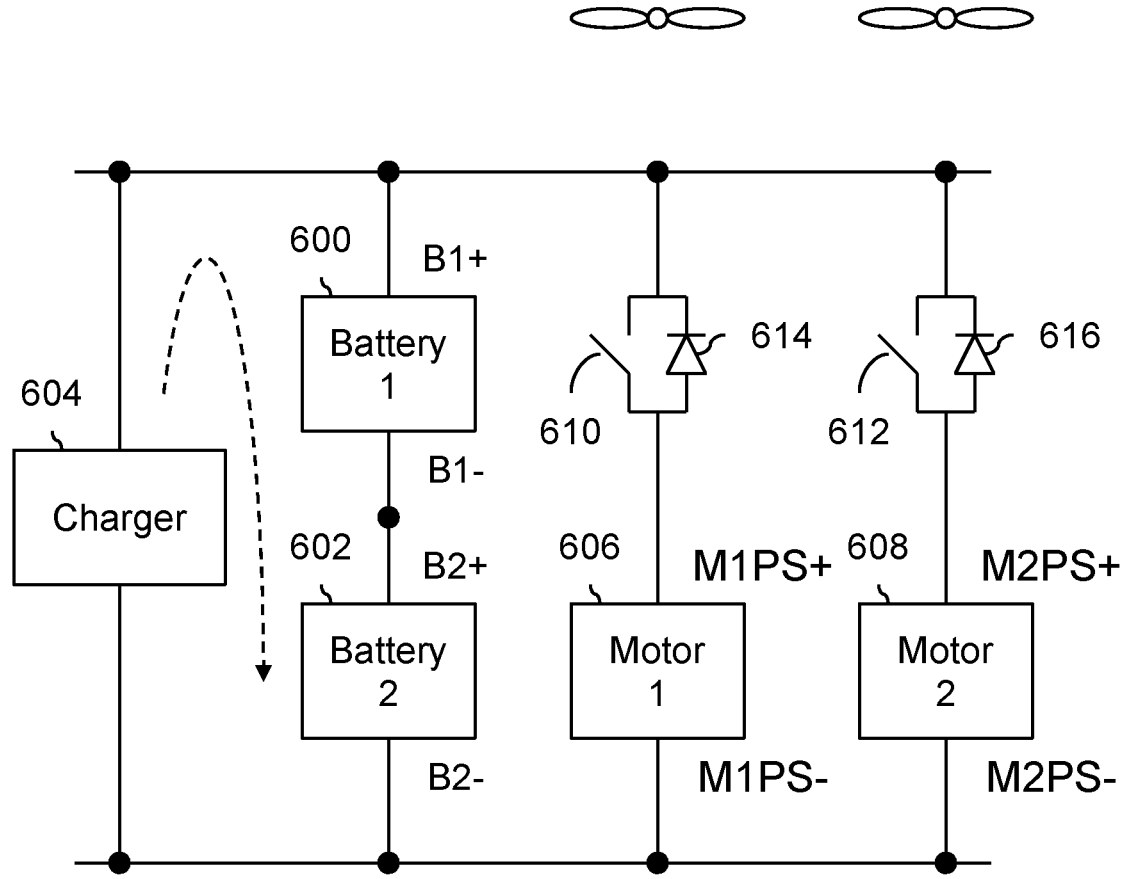
FIG. 6 is a diagram illustrating an embodiment of a flexible battery system where the batteries are in series.

FIG. 6 is a diagram illustrating an embodiment of a flexible battery system where the batteries are in series. For example, battery configuration controller 300 in FIG. 3 may have set the configurable electrical connectors (302), which may include one or more switches, to create the electrical configuration shown here. As before, a battery configuration controller (e.g., 300 in FIG. 3) and at least some configurable electrical connectors (e.g., 302 in FIG. 3) are not shown for readability.

In this configuration, the two batteries (600 and 602) are connected together in series. For example, the switches or other configurable electrical connectors may be set or configured so that the negative connector of one battery (e.g., B1−) is electrically connected to the positive connector of the other battery (e.g., B2+).

A charger (604), which is connected in parallel to the serially-connected batteries (600 and 602), charges the batteries. In this example, to prevent any current flow from the charger (604) to the motors (606 and 608) during charging, a switch (610 and 612) in parallel with a diode (614 and 616) is placed between the charger and each motor. In the state shown here, the switches (610 and 612) are open so that the only possible path from the charger to each of the motors is via the diodes and the orientation of the diodes prevents any current flow into the motors in this mode.

In the example of FIG. 3, the switches (610 and 612 in FIG. 6) and diodes (614 and 616 in FIG. 6) are included in the configurable electrical connectors (302 in FIG. 3). The state (e.g., open versus closed) of the switches (610 and 612 in FIG. 6) is controlled by battery configuration controller 300 in FIG. 3.

In the example of FIG. 4, a battery configuration controller may close the switches (610 and 612 in FIG. 6) so that the batteries (400 and 402 in FIG. 4) can supply power to the motors (404 and 406 in FIG. 4) during flight.

Putting the batteries into a serial configuration as shown here is helpful during charging because it reduces cost of the chargers and increases the number of commercially available chargers that may be used. For example, in the older, fixed arrangement described above where each battery only powered a corresponding motor (and the configuration could not be changed), a single charger is capable of performing the charging but there are few commercially-available options and the ones that exist are expensive. If the flexible battery system described above is put in to the series configuration (see, e.g., FIG. 6) during charging, this increases the number of commercial "off the shelf" charging options.

Similarly, even though a single charger could be used to charge the parallel configuration shown in FIG. 4, the heat generated from the wires and connections would noticeably increase due to the higher currents needed. This means that such a charger would need more heat resistant (and costly) components to accommodate this. Also, the higher currents required at the lower voltages substantially impact on-vehicle wire weight (e.g., to accommodate the higher currents that are expected to pass through the wires), as well as many propulsion system thermal performance components (e.g., they have to be able to handle more heat and therefore more expensive ones are required). In contrast, if the flexible battery system is put into a series configuration (see, e.g., FIG. 6), the battery system can be charged at a higher voltage using lower current, which is more desirable for a variety of reasons (e.g., reduced wire weight, less expensive thermal components, etc.).

In some embodiments, a configuration instruction to put the batteries into this configuration may be generated in anticipation of charging. The following figure shows an example of this more formally and/or generally in a flowchart.

Figure 7:
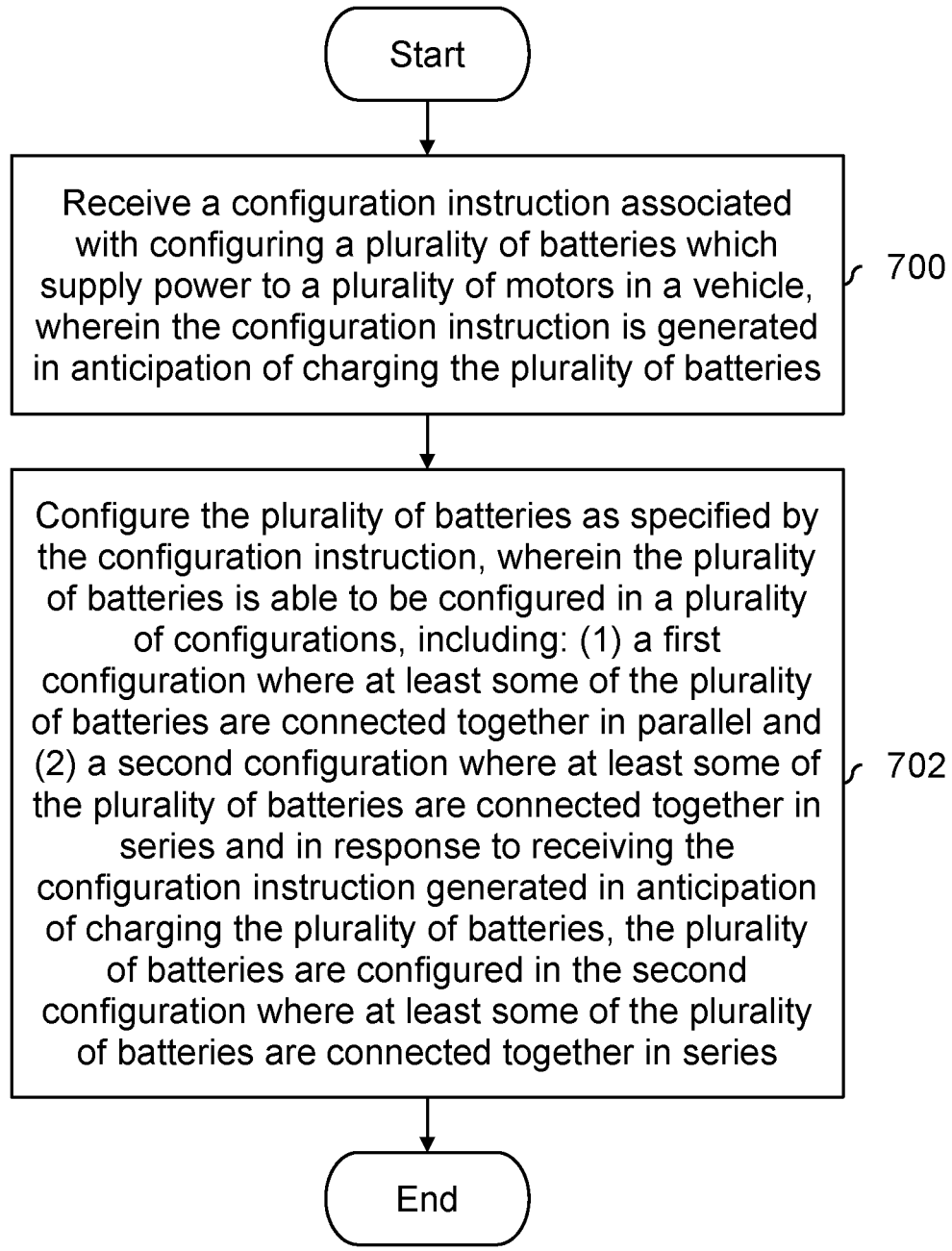
FIG. 7 is a flowchart illustrating an embodiment of a process to configure a plurality of batteries, including by connecting at least some batteries together in series in response to a configuration instruction generated in anticipation of charging the plurality of batteries.

FIG. 7 is a flowchart illustrating an embodiment of a process to configure a plurality of batteries, including by connecting at least some batteries together in series in response to a configuration instruction generated in anticipation of charging the plurality of batteries. In some embodiments, the process is performed by some battery configuration controller (e.g., 300 in FIG. 3).

At 700, a configuration instruction associated with configuring a plurality of batteries which supply power to a plurality of motors in a vehicle is received, wherein the configuration instruction is generated in anticipation of charging the plurality of batteries.

For example, the configuration instruction may be generated in response to detecting that some cap or cover over a charging port has been removed, or in response to a (e.g., male) connector of a charger being coupled to or inserted into a (e.g., female) charging port of the vehicle.

At 702, the plurality of batteries is configured as specified by the configuration instruction, wherein the plurality of batteries is able to be configured in a plurality of configurations, including: (1) a first configuration where at least some of the plurality of batteries are connected together in parallel and (2) a second configuration where at least some of the plurality of batteries are connected together in series and in response to receiving the configuration instruction generated in anticipation of charging the plurality of batteries, the plurality of batteries are configured in the second configuration where at least some of the plurality of batteries are connected together in series.

See, for example, the configuration shown in FIG. 6. As shown in the example of FIG. 6, in some embodiments, a battery configuration controller (e.g., 300 in FIG. 3) sets one or more switches (e.g., 610 and 612 in FIG. 6) at some connection or input to the motors (e.g., 606 and 608 in FIG. 6) so that no power is supplied to the at-rest motors during charging.

In some cases, a battery configuration controller changes the switches and/or configurable electrical connectors to electrically isolate a failing or bad battery. The following figures describe an example of this.

Figure 8:
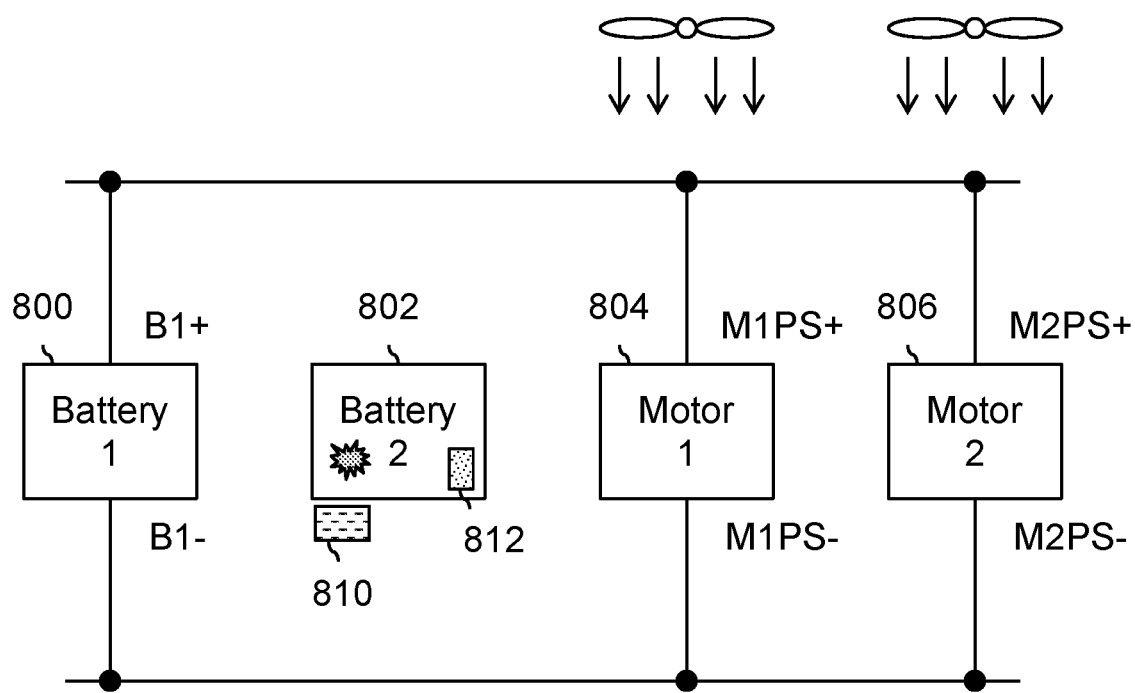
FIG. 8 is a diagram illustrating an embodiment of a flexible battery system where a bad battery is isolated.

FIG. 8 is a diagram illustrating an embodiment of a flexible battery system where a bad battery is isolated. In the example shown, the vehicle is in flight. Prior to the state shown here, the batteries and motors were in the configuration shown in FIG. 4. In this example, during the flight, the second battery (802) goes bad. If the second battery remains electrically connected with the rest of the system, then the good first battery (800) will send current to the bad second battery (802) because of the latter's lower voltage. However, the additional current to the bad second battery (802) will merely cause it to degrade further (e.g., heat up more). To prevent this (or at least mitigate the damage), a battery configuration controller changes the settings of the switches and/or configurable electrical connections so that the second battery is electrically isolated (i.e., no longer connected) from the rest of the system, as shown here. The first battery (800) remains connected to the motors (804 and 806) so that both motors are available for the vehicle to land.

Furthermore, the configuration shown here is helpful because all of the motors still have access to a battery. In the older, fixed configuration where each battery only supplied power to a single, counterpart motor (and the connections could not be reconfigured), a bad battery would result in a "motor out" condition because the counterpart motor (propeller) would lose its battery. Instead of having (as an example) 10 operational motors (propellers), only 9 motors (propellers) would be operational. In contrast, the flexible battery system described herein permits a bad battery to be isolated without losing a motor (propeller).

Another benefit to this example is that it can isolate a bad battery faster than some other systems. For example, some other system may try to use passive devices, such as fuses (e.g., one in series with each battery), to electrically isolate a bad battery. When too much current flows through the fuse and battery, the fuse breaks and the battery is electrically isolated. However, in this example, a bad battery is detected or otherwise flagged if a voltage sensor (e.g., across the battery) detects that a given battery has a voltage that is lower than some voltage threshold, or if a temperature sensor registers a temperature that is above some temperature threshold.

Similarly, in some embodiments, the system could be configured to (quickly) create an open circuit around and/or electrically isolate a motor that had some type of failure in response to detecting a failure (e.g., in the motor controller, propulsion unit, etc.). It is noted that this could be achieved without electrically isolating any of the batteries, if desired.

In some embodiments, there are multiple temperature sensors, including one or more external temperature sensors 810 adjacent to the battery's (metal) case or container (which are good for detecting when the failing cell is one of the outermost cells near the case) and one or more internal temperature sensors 812 between the layers of cells (e.g., which are good for detecting when the failing cell is one of the innermost cells near the center of the layers).

Once a battery failure is detected (e.g., using a temperature threshold and/or a voltage threshold), an appropriate configuration instruction is generated and sent to the battery configuration controller and the switches or other configurable electrical connectors are set accordingly (i.e., to isolate the bad battery).

The following figure describes this more formally and/or generally in a flowchart.

Figure 9:
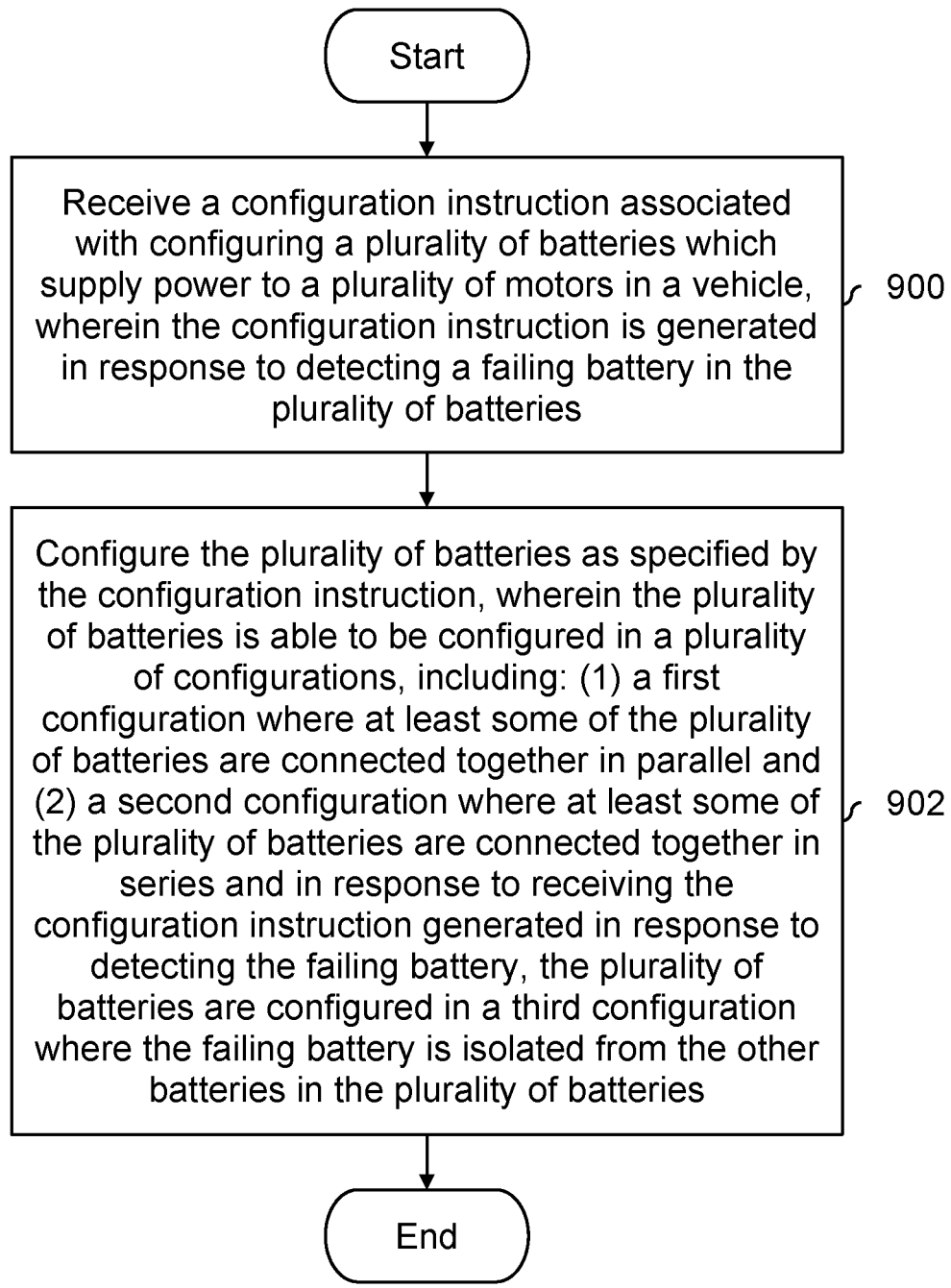
FIG. 9 is a flowchart illustrating an embodiment of a process to configure a plurality of batteries, including by isolating a failing battery.

FIG. 9 is a flowchart illustrating an embodiment of a process to configure a plurality of batteries, including by isolating a failing battery. In some embodiments, the process is performed by a battery configuration controller (e.g., 300 in FIG. 3).

At 900, a configuration instruction associated with configuring a plurality of batteries which supply power to a plurality of motors in a vehicle is received, wherein the configuration instruction is generated in response to detecting a failing battery in the plurality of batteries.

For example, the failing battery may be detected at step 900 using one or more of the following: a voltage threshold or a temperature threshold (as described above). In some embodiments, each battery in the plurality of batteries includes an internal temperature sensor (e.g., inside the battery's container, nestled between the layers of cells) and an external temperature sensor (e.g., external to the battery's container).

At 902, the plurality of batteries is configured as specified by the configuration instruction, wherein the plurality of batteries is able to be configured in a plurality of configurations, including: (1) a first configuration where at least some of the plurality of batteries are connected together in parallel and (2) a second configuration where at least some of the plurality of batteries are connected together in series and in response to receiving the configuration instruction generated in response to detecting the failing battery, the plurality of batteries are configured in a third configuration where the failing battery is isolated from the other batteries in the plurality of batteries. See, for example, FIG. 8.

Returning briefly to FIGS. 1A and 1B, a design choice or constraint associated with the example multicopter shown there is that the propellers are at fixed angles and cannot be tilted. As a result of this, if the multicopter hovers mid-air for longer periods of time, this places a heavy burden on the two fore-most motors given the vehicle's center of gravity, distribution of propellers, the propellers' angles, etc. Conversely, during sustained high-speed forward flight of the vehicle shown, the aft-most motors are the most strained. In some embodiments, a flexible battery system configures the batteries as well as the power supplies to the motors as described in the manner described by the following figures to better handle long-term operation forward flight (or, alternatively, hovering using a slightly difference configuration).

Figure 10A:
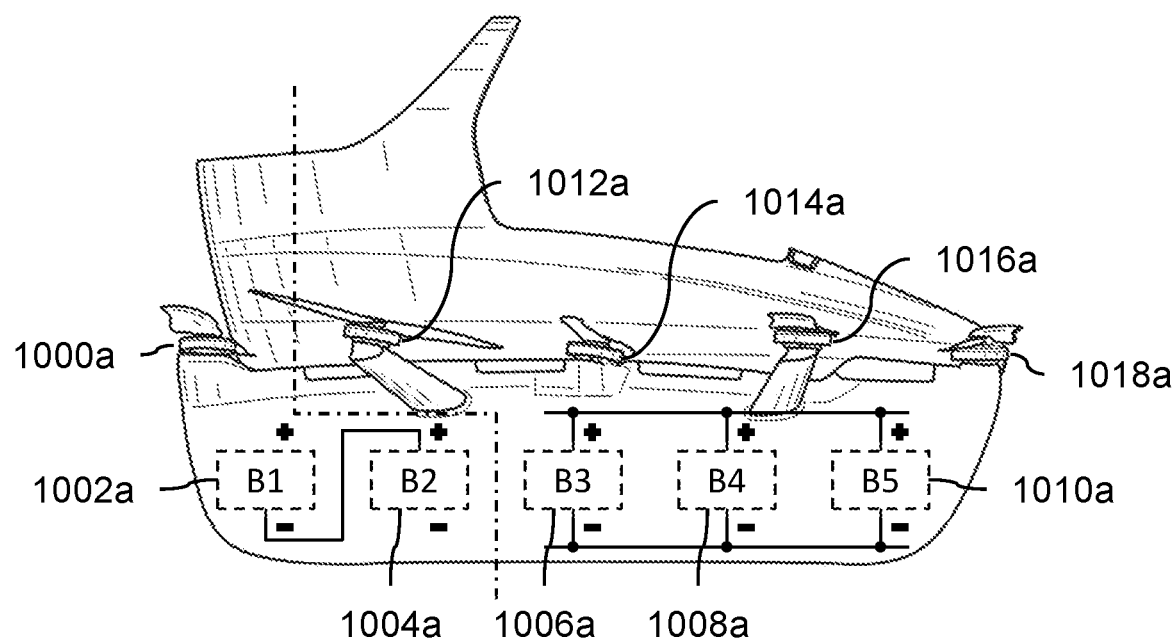
FIG. 10A is a diagram illustrating an embodiment of a flexible battery system where one group of batteries is connected together in series and another group of batteries is connected together in parallel.

FIG. 10A is a diagram illustrating an embodiment of a flexible battery system where one group of batteries is connected together in series and another group of batteries is connected together in parallel. As described above, if the multicopter shown here flies forward at high speeds for an extended period of time, this puts a strain on the aft-most motors, only one of which is shown from this view (e.g., 1000a). In this example, to accommodate this, a battery configuration controller (not shown to preserve the readability of the figure) configures one or more switches and/or configurable electrical connectors (similarly not shown to preserve readability) to produce the configuration shown here. In some embodiments, a decision to put the system in this configuration and the configuration change itself are performed prior to takeoff (e.g., since changing the battery configuration mid-flight could be challenging).

A first group of batteries (1002a and 1004a) are connected together in series to produce a higher voltage battery, in this case two times the voltage of a single battery. The in-series batteries are then used to power the (e.g., left or right) aft-most motor (1002a) so that that motor has a power supply at two times the voltage of a single battery.

The remaining batteries (1006a, 1008a, and 1010a) are used to collectively power the four fore-most motors (1012a, 1014a, 1016a, and 1018a) on that side of the vehicle. Since the batteries in this group are connected together in parallel, the voltage supplied to those four motors is 1×, not 2×, the voltage of a single battery.

Returning briefly to FIG. 3, it is noted that the power supply lines (e.g., M1PS+, M1PS−, M2PS+, and M2PS−) to the motors (306a and 306b) are coming from the configurable electrical connectors (302). This permits the system to have one set of motors (e.g., 1000a in FIG. 10A) that is powered by one set of batteries (e.g., serially-connected batteries 1002a and 1004a in FIG. 10A) and another set of motors (e.g., 1012a, 1014a, 1016a, and 1018a in FIG. 10A) that is powered by another set of batteries (e.g., in-parallel batteries 1006a, 1008a, and 1010a in FIG. 10A).

The following figure shows the electrical connections more clearly.

Figure 10B:
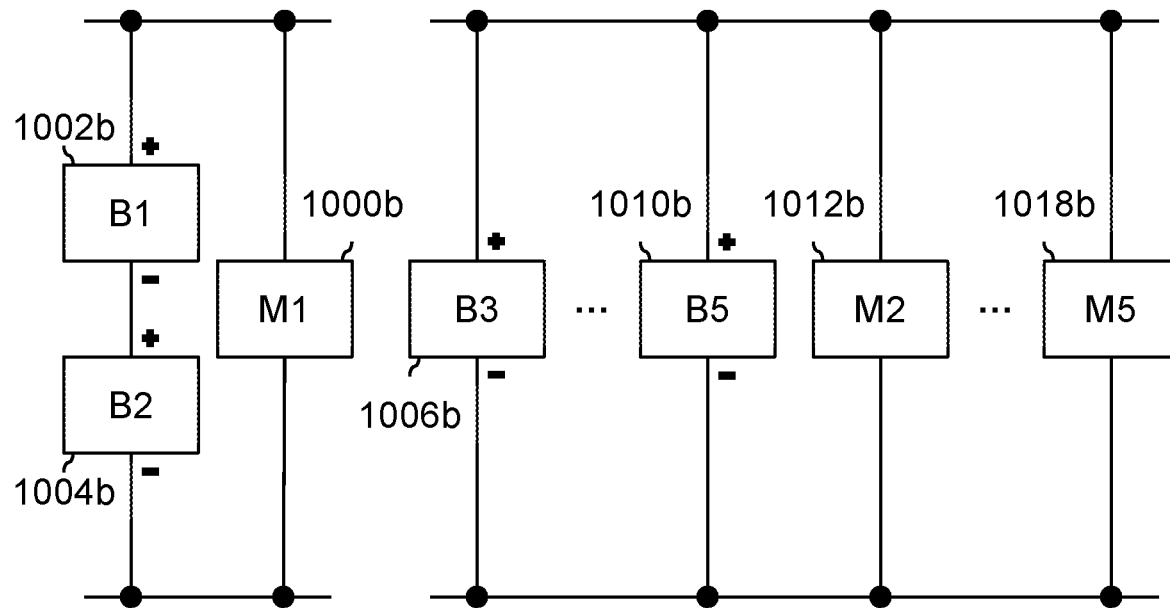
FIG. 10B is a diagram illustrating an embodiment of a first set of one or more motors that is powered by a first set of batteries and a second set of one or more motors that is powered by a second set of one or more batteries.

FIG. 10B is a diagram illustrating an embodiment of a first set of one or more motors that is powered by a first set of batteries and a second set of one or more motors that is powered by a second set of one or more batteries. FIG. 10B continues the example of FIG. 10A, showing the electrical connections in FIG. 10A more clearly.

As described above, two batteries (1002b and 1004b) are configured to be in a series with each other and the serially-connected batteries are used to power the aft-most motor (1000b) when the multicopter is in forward flight mode at high speed for prolonged periods of time. A benefit of this arrangement is that the higher voltage of the serially-connected batteries (1002b and 1004b) means that less current needs to be supplied to the motor (1000b) which in turn means that less heat is produced by the motor.

The other three batteries (1006b, 1010b) are connected together in parallel in another, electrically independent part of the system. Those batteries supply power to the other four motors (1012b, 1018b).

In some embodiments, the motor (1000b), motor controller, and/or propeller is/are designed to benefit from serially-connected batteries (1002b and 1004b). More specifically, a static motor-propeller combination (i.e., not designed to take advance of the voltage step up from 1× to 2×) does not benefit in terms of current draw. The necessary thrust dictates the torque required (through the propeller design) and the torque requirement dictates the necessary current (through the motor design). Thus, a three-phase current (e.g., at 0°, 120°, and 240° phase) delivered to the motor is still the same, but the current in the DC lines feeding the motor controller does decrease in proportion to the voltage increase.

In contrast, a with dynamic and/or configurable motor and motor controller combination, the torque constant of the motor could be dynamically altered. For example, this may be done with a 6-phase motor (e.g., at 0°, 60°, 120°, . . . ) and a motor controller with an appropriate control strategy. This would lower the current, and thus the thermal stresses, on the DC lines, motor controller, and three-phase lines.

In one example application, the flexible battery system is configured to be in the state shown in FIG. 4. For example, if the vehicle is in motion, the transient or temporary surges by the motors (e.g., as the vehicle banks or performs some other maneuver) may be better satisfied by the configuration shown in FIG. 4 where all of the batteries and motors are in parallel with each other in a single electrical group.

In contrast, the configuration shown in FIGS. 10A and 10B may be better suited when there is sustained demand placed on a single motor (in that example, the aft-most motor). In one example, strong winds cause certain motors to working harder to maintain a static position during hover and it is known in advance that the vehicle will hover a lot during its upcoming flight. The exemplary multicopter collects real-time conditions (e.g., wind speed) and compares it to the intended direction and/or velocity (e.g., if the flight is autonomous flight). In response to the predicted loads in live conditions, the system could be configured (e.g., prior to flight) so that the motors with the highest predicted loads are configured to have in-series batteries.

In some other embodiments, the switch or configuration change is made mid-flight. As before, real-time conditions such as wind speed and/or desired vehicle velocity, attitude, and/or thrust may be measured where a model uses that information to predict which motor(s) will requires more power (e.g., in light of strong, sustained winds) and in response, reconfigure the system before the maximum power draw from that motor is reached.

The following figure describes the example above more generally and/or formally in a flowchart.

Figure 11:
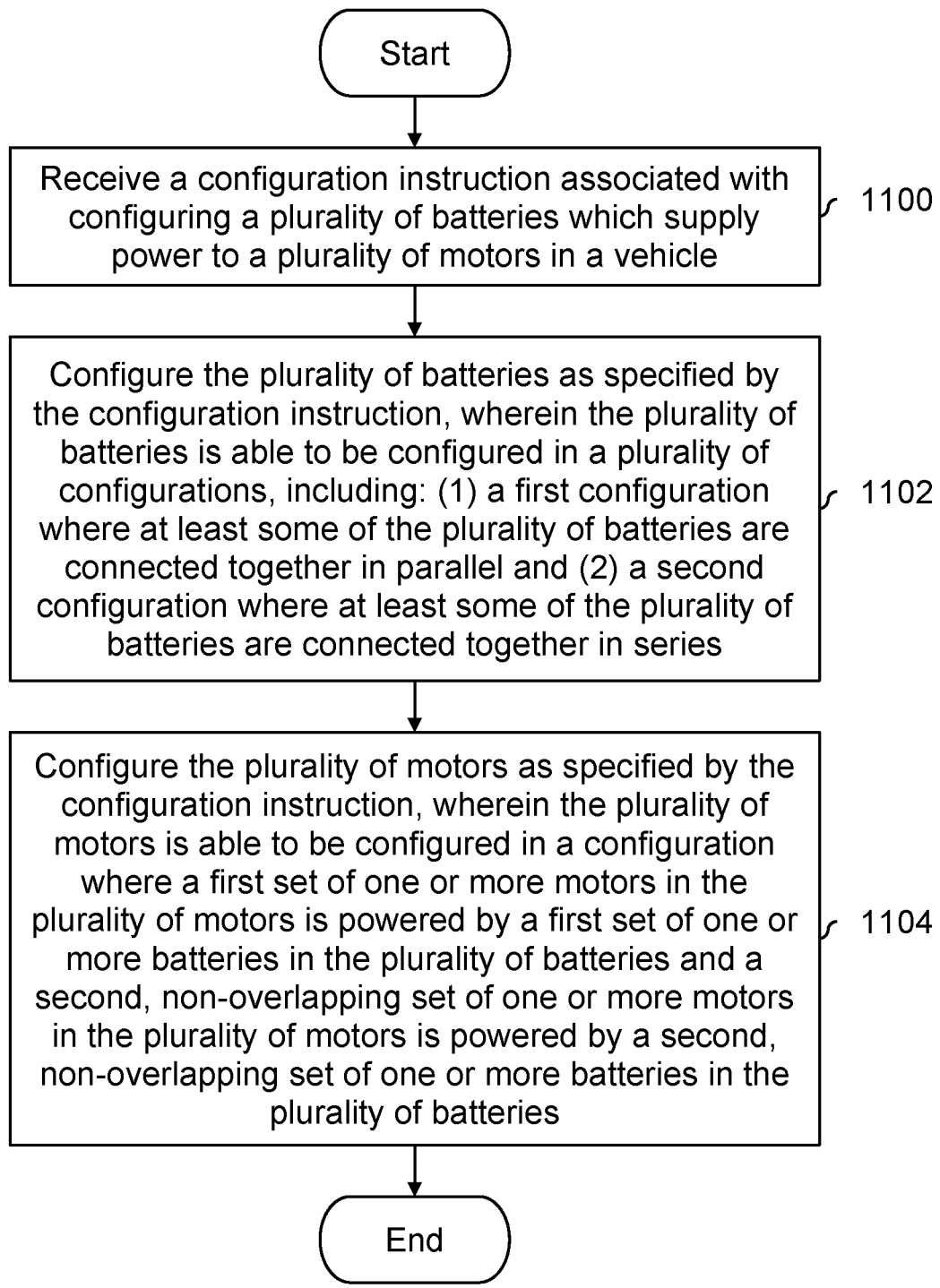
FIG. 11 is a flowchart illustrating an embodiment of a process to configure a first set of one or more motors that is powered by a first set of batteries and a second set of one or more motors that is powered by a second set of one or more batteries.

FIG. 11 is a flowchart illustrating an embodiment of a process to configure a first set of one or more motors that is powered by a first set of batteries and a second set of one or more motors that is powered by a second set of one or more batteries. As with the examples above, the process described below may be performed by a battery configuration controller.

At 1100, a configuration instruction associated with configuring a plurality of batteries which supply power to a plurality of motors in a vehicle is received. For example, this configuration shown in FIGS. 10A and 10B may be useful if a multicopter is going to be hovering mid-air for an extended period of time. In some embodiments, an appropriate configuration instruction is generated when the vehicle has been hovering for more than a certain (i.e., threshold) amount of time.

At 1102, the plurality of batteries is configured as specified by the configuration instruction, wherein the plurality of batteries is able to be configured in a plurality of configurations, including: (1) a first configuration where at least some of the plurality of batteries are connected together in parallel and (2) a second configuration where at least some of the plurality of batteries are connected together in series.

For example, the positive and negative battery connectors (e.g., B1+, B1−, B2+, and B2−) are passed to configurable electrical connectors 302 in FIG. 3 and so switches or other connectors in that block may be set or configured to achieve the desired serial and/or parallel battery connections.

At 1104, the plurality of motors is configured as specified by the configuration instruction, wherein the plurality of motors is able to be configured in a configuration where a first set of one or more motors in the plurality of motors is powered by a first set of one or more batteries in the plurality of batteries and a second, non-overlapping set of one or more motors in the plurality of motors is powered by a second, non-overlapping set of one or more batteries in the plurality of batteries.

As described above, in some embodiments, the first set of batteries (which power the first set of motors) is in the first configuration at step 1104 where at least some of the plurality of batteries are connected together in parallel. See, for example, in-parallel batteries 1006*b*-1010*b* in FIG. 10B. The second set of batteries (which power the second set of motors) may similarly be in a second configuration where at least some of the plurality of batteries are connected together in series. See, for example, in-series batteries 1002*b* and 1004*b* in FIG. 10B.

In some embodiments, in response to receiving a configuration instruction generated in response to a time associated with the vehicle being in a hovering mode exceeding a time threshold, the battery configuration controller configures the plurality of batteries to be in the configuration where the first set of motors is powered by the first set of batteries and the second, non-overlapping set of is powered by the second, non-overlapping set of batteries at step 1104 in FIG. 11.

Similarly, in some embodiments, in response to receiving a configuration instruction generated in response to a time associated with the vehicle being in a forward flight mode exceeding a time threshold while a vehicle speed exceeds a speed threshold (e.g., the vehicle has been flying faster than the speed threshold for longer than the time threshold), the battery configuration controller configures the plurality of batteries to be in the configuration where the first set of motors is powered by the first set of batteries and the second, non-overlapping set of is powered by the second, non-overlapping set of batteries at step 1104 in FIG. 11.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a plurality of batteries which supply power to a plurality of motors in a vehicle, wherein a first subset of the plurality of batteries is configured to power at least a first subset of the plurality of motors and a second subset of the plurality of batteries is configured to power at least a second subset of the plurality of motors;
    one or more sensors that are configured to monitor the first subset of the plurality of batteries and generate an indication associated with a bad battery if any such bad battery is detected in the first subset of the plurality of batteries; and
    a battery configuration controller that is configured to:
        receive a configuration instruction associated with configuring the plurality of batteries to electrically isolate the bad battery, wherein the configuration instruction is generated in response to receiving the indication associated with the bad battery;
        re-configure the plurality of batteries as specified by the configuration instruction to electrically isolate the bad battery and power the first subset of the plurality of motors using the second subset of the plurality of batteries, wherein the plurality of batteries is able to be configured in a plurality of configurations;
        receive a subsequent configuration instruction based at least on real-time environmental conditions in which the vehicle is operating or expected to operate, wherein:
            the subsequent configuration instruction is based at least on a flight mode of the vehicle,
            the flight mode includes at least one of: a forward flight mode and a hover mode, and
            a subset of the plurality of motors is predicted to have loads above a threshold in the hover mode but not in the forward flight mode; and
        re-configure the plurality of batteries as specified by the subsequent configuration instruction to provide those motors of the plurality of motors with predicted loads above the threshold to have in-series batteries and excluding the isolated bad battery.

2. The system of claim 1, wherein the one or more sensors includes a voltage sensor configured to detect a battery having a voltage lower than a threshold and generate the indication associated with a bad battery in response to detecting the battery having a voltage lower than the threshold.

3. The system of claim 1, wherein the one or more sensors includes a temperature sensor configured to detect a temperature above a threshold and generate the indication associated with a bad battery in response to detecting a battery having a temperature higher than the threshold.

4. The system of claim 3, wherein the temperature sensor is external and adjacent to at least one of a battery case or battery container.

5. The system of claim 3, wherein the temperature sensor is internal and provided between layers of battery cells.

6. The system of claim 1, wherein the bad battery is electrically isolated such that the bad battery does not send current to another battery.

7. The system of claim 1, wherein the bad battery is electrically isolated including by creating an open circuit around the bad battery.

8. The system of claim 1, wherein the configuration instruction generated in anticipation of charging the plurality of batteries is based at least in part on a flight mode associated with charging.

9. The system of claim 1, wherein the plurality of batteries is able to be configured in a plurality of configurations including an initial configuration in which the first subset of the plurality of batteries is in parallel with the second subset of the plurality of batteries.

10. The system of claim 1, wherein the re-configuration of the plurality of batteries as specified by the configuration instruction to electrically isolate the bad battery is performed during flight.

11. The system of claim 1, wherein:
the first subset of the plurality of batteries includes at least one battery having a plurality of cells; and
the one or more sensors includes a sensor provided at least one of: adjacent to a case of the at least one battery or between at least two layers of the plurality of cells.

12. A system, comprising:
a plurality of batteries which supply power to a plurality of motors in a vehicle, wherein a first subset of the plurality of batteries is configured to power at least a first subset of the plurality of motors and a second subset of the plurality of batteries is configured to power at least a second subset of the plurality of motors;
one or more sensors that are configured to monitor the first subset of the plurality of batteries and generate an indication associated with a bad battery if any such bad battery is detected in the first subset of the plurality of batteries; and
a battery configuration controller that is configured to:
receive a configuration instruction associated with configuring the plurality of batteries to electrically isolate the bad battery, wherein the configuration instruction is generated in response to receiving the indication associated with the bad battery;
re-configure the plurality of batteries as specified by the configuration instruction to electrically isolate the bad battery and power the first subset of the plurality of motors using the second subset of the plurality of batteries, wherein the plurality of batteries is able to be configured in a plurality of configurations;
receive a configuration instruction generated in anticipation of the vehicle taking off;
in response to receiving the configuration instruction generated in anticipation of the vehicle taking off, configure the plurality of batteries to be in a configuration where at least some of the plurality of batteries are connected together in parallel;
receive a subsequent configuration instruction based at least on real-time environmental conditions in which the vehicle is operating or expected to operate, wherein:
the subsequent configuration instruction is based at least on a flight mode of the vehicle,
the flight mode includes at least one of: a forward flight mode and a hover mode, and
a subset of the plurality of motors is predicted to have loads above a threshold in the hover mode but not in the forward flight mode; and
re-configure the plurality of batteries as specified by the subsequent configuration instruction to provide those motors of the plurality of motors with predicted loads above a threshold to have in-series batteries and excluding the isolated bad battery.

13. A method, comprising:
receiving an indication associated with a bad battery if any such bad battery is detected in a first subset of a plurality of batteries, wherein the plurality of batteries are configured to supply power to a plurality of motors in a vehicle and the first subset of the plurality of batteries is configured to power at least a first subset of the plurality of motors and a second subset of the plurality of batteries is configured to power at least a second subset of the plurality of motors;
receiving a configuration instruction associated with configuring a plurality of batteries to electrically isolate a bad battery, wherein the configuration instruction is generated in response to receiving the indication associated with the bad battery;
re-configuring the plurality of batteries as specified by the configuration instruction to electrically isolate the bad battery and power the first subset of the plurality of motors using the second subset of the plurality of batteries, wherein the plurality of batteries is able to be configured in a plurality of configurations;
receiving a subsequent configuration instruction based at least on real-time environmental conditions in which the vehicle is operating or expected to operate, wherein:
the subsequent configuration instruction is based at least on a flight mode of the vehicle,
the flight mode includes at least one of: a forward flight mode and a hover mode, and
a subset of the plurality of motors is predicted to have loads above a threshold in the hover mode but not in the forward flight mode; and
re-configuring the plurality of batteries as specified by the subsequent configuration instruction to provide those motors of the plurality of motors with predicted loads above the threshold to have in-series batteries and excluding the isolated bad battery.

14. The method of claim 13, wherein the bad battery is detected in response to detecting a battery having a voltage lower than a threshold.

15. The method of claim 13, wherein the bad battery is detected in response to detecting a battery having a temperature higher than a threshold.

16. The method of claim 15, wherein the temperature is detected by a temperature sensor external and adjacent to at least one of a battery case or battery container.

17. The method of claim 15, wherein the temperature is detected by an internal temperature provided between layers of battery cells.

18. The method of claim 13, wherein the bad battery is electrically isolated such that the bad battery does not send current to another battery.

19. The method of claim 13, wherein the bad battery is electrically isolated including by creating an open circuit around the bad battery.

20. The method of claim 13, wherein the configuration instruction generated in anticipation of charging the plurality of batteries is based at least in part on a flight mode associated with charging.

21. A computer program product, the computer program product being embodied in a non-transitory computer readable storage medium and comprising computer instructions for:
receiving an indication associated with a bad battery if any such bad battery is detected in a first subset of a plurality of batteries, wherein the plurality of batteries are configured to supply power to a plurality of motors in a vehicle and the first subset of the plurality of batteries is configured to power at least a first subset of the plurality of motors and a second subset of the plurality of batteries is configured to power at least a second subset of the plurality of motors;

receiving a configuration instruction associated with configuring a plurality of batteries to electrically isolate a bad battery, wherein the configuration instruction is generated in response to receiving the indication associated with the bad battery;

re-configuring the plurality of batteries as specified by the configuration instruction to electrically isolate the bad battery and power the first subset of the plurality of motors using the second subset of the plurality of batteries, wherein the plurality of batteries is able to be configured in a plurality of configurations;

receiving a subsequent configuration instruction based at least on real-time environmental conditions in which the vehicle is operating or expected to operate, wherein:
- the subsequent configuration instruction is based at least on a flight mode of the vehicle,
- the flight mode includes at least one of: a forward flight mode and a hover mode, and
- a subset of the plurality of motors is predicted to have loads above a threshold in the hover mode but not in the forward flight mode; and re-configuring the plurality of batteries as specified by the subsequent configuration instruction to provide those motors of the plurality of motors with predicted loads above the threshold to have in-series batteries and excluding the isolated bad battery.

\* \* \* \* \*

UNITED STATES PATENT AND TRADEMARK OFFICE
CERTIFICATE OF CORRECTION

PATENT NO. : 11,642,972 B2
APPLICATION NO. : 16/904335
DATED : May 9, 2023
INVENTOR(S) : Joseph Orender, Christopher Scott Saunders and Derek Wong It is certified that error appears in the above-identified patent and that said Letters Patent is hereby corrected as shown below:

In the Specification

In Column 6, Line(s) 37, after "reduces", insert --the--.

In Column 6, Line(s) 45, delete "in to" and insert --into--, therefor.

In Column 10, Line(s) 42, delete "working" and insert --work--, therefor.

In Column 10, Line(s) 55, delete "requires" and insert --require--, therefor.

Signed and Sealed this
Fifth Day of March, 2024

Katherine Kelly Vidal
*Director of the United States Patent and Trademark Office*